US012756487B2

(12) United States Patent
Hehn et al.

(10) Patent No.: US 12,756,487 B2
(45) Date of Patent: Oct. 6, 2026

(54) MULTI-DIMENSIONAL MATERIAL-AWARE GEOMETRIC WIRELESS CHANNEL RENDERING USING MACHINE LEARNING MODELS

(71) Applicant: QUALCOMM Incorporated, San Diego, CA (US)

(72) Inventors: Thomas Markus Hehn, Delft (NL); Tribhuvanesh Orekondy, Wettingen (CH); Akash Sandeep Doshi, San Diego, CA (US); Arash Behboodi, Amsterdam (NL); June Namgoong, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 370 days.

(21) Appl. No.: 18/604,232

(22) Filed: Mar. 13, 2024

(65) Prior Publication Data

US 2025/0175272 A1 May 29, 2025

Related U.S. Application Data

(60) Provisional application No. 63/602,986, filed on Nov. 27, 2023.

(51) Int. Cl.

*H04B 17/391* (2015.01)
*H04B 7/08* (2006.01)
*H04B 17/318* (2015.01)

(52) U.S. Cl.

CPC ....... *H04B 17/3912* (2015.01); *H04B 7/0897* (2013.01); *H04B 17/318* (2015.01)

(58) Field of Classification Search

CPC . H04B 17/3912; H04B 17/318; H04B 7/0897
See application file for complete search history.

(56) References Cited

U.S. PATENT DOCUMENTS

2018/0343073 A1* 11/2018 Hinton ............... H04B 17/0087
2021/0134046 A1* 5/2021 Lu .......................... G06N 3/084

(Continued)

OTHER PUBLICATIONS

Arnold M., et al., “MaxRay: A Raytracing-based Integrated Sensing and Communication Framework”, arXiv:2112.01751v1 [cs.HC], Dec. 3, 2021, 6 Pages.

(Continued)

*Primary Examiner* — David Bilodeau
(74) *Attorney, Agent, or Firm* — Patterson + Sheridan LLP

(57) ABSTRACT

Certain aspects of the present disclosure provide techniques and apparatus for generating channel estimates in a spatial environment based on learned material properties for objects in the spatial environment. An example method generally includes receiving, from a ray-tracing model, a plurality of multipath components corresponding to a signal transmitted from a transmitter at a first location in a spatial environment to a receiver at a second location in the environment. For each respective multipath component, energy field characteristics of the respective multipath component are estimated, using a machine learning model, based on interactions with one or more objects in the environment, one or more learned parameters of the machine learning model being associated with one or more properties of the objects. A channel estimate is generated based on the estimated characteristics of each multipath component. One or more actions may be taken based on the generated channel estimate.

20 Claims, 6 Drawing Sheets

(56) References Cited

U.S. PATENT DOCUMENTS

| | | | | |
|---|---|---|---|---|
| 2022/0383118 | A1* | 12/2022 | Nair | G06N 3/0455 |
| 2024/0214093 | A1* | 6/2024 | Kim | H04B 17/3912 |
| 2024/0323719 | A1* | 9/2024 | Corgan | H04W 24/06 |
| 2024/0356661 | A1* | 10/2024 | Vierimaa | H04L 5/0005 |

OTHER PUBLICATIONS

Charbonnier R., et al., "Calibration of Ray-Tracing with Diffuse Scattering against 28-GHz Directional Urban Channel Measurements", IEEE Transactions on Vehicular Technology, Dec. 2020, vol. 69, No. 12, Nov. 2020, pp. 1-14.
Doshi A., et al., "Radio DIP—Completing Radio Maps using Deep Image Prior", 2023 IEEE Global Communications Conference: Wireless Communications, Dec. 2023, pp. 1543-1548.
Esser P., et al., "Taming Transformers for High-Resolution Image Synthesis", arXiv:2012.09841v3 [cs.CV], Jun. 23, 2021, pp. 1-52.
ETSI: "5G, Study on Channel Model for Frequencies from 0.5 to 100 GHz (3GPP TR 38.901 version 16.1.0 Release 16)", ETSI TR 138 901, V16.1.0, Nov. 2020, pp. 1-102.
Hehn T.M., et al., "Transformer-Based Neural Surrogate for Link-Level Path Loss Prediction from Variable-Sized Maps", arXiv:2310.04570v2 [cs.LG], Oct. 10, 2023, 6 Pages.
Ho J., et al., "Classifier-Free Diffusion Guidance", arXiv:2207.12598v1 [cs.LG], Jul. 26, 2022, pp. 1-14.
Ho J., et al., "Denoising Diffusion Probabilistic Models", arXiv:2006.11239v2 [cs.LG], 34th Conference on Neural Information Processing Systems, Dec. 16, 2020, pp. 1-25.
Hoydis J., et al., "Sionna: An Open-Source Library for Next-Generation Physical Layer Research", arXiv:2203.11854v2 [cs.IT], Mar. 20, 2023, pp. 1-5.
Hoydis J., et al., "Sionna RT: Differentiable Ray Tracing for Radio Propagation Modeling", arXiv:2303.11103v2 [cs.IT], Jul. 19, 2023, 5 Pages.
Kanhere O., et al., "Calibration of NYURay, a 3D mmWave and sub-THz Ray Tracer using Indoor, Outdoor, and Factory Channel Measurements", arXiv:2302. 12380v1 [cs.IT], Feb. 24, 2023, 6 Pages.
Meta AI: "PyTorch", retrieved from https://pytorch.org on Jun. 13, 2024, 5 pages.
Orekondy T., et al., "WiNeRT: Towards Neural Ray Tracing for Wireless Channel Modelling and Differentiable Simulations", In International Conference on Learning Representations (ICLR), May 2023, pp. 1-9.
Raschkowski L., et al., "METIS Channel Models", ICT-317669-METIS/D1.4, METIS 2020, Jul. 2015, 224 Pages.
Rombach R., et al., "High-Resolution Image Synthesis with Latent Diffusion Models", arXiv:2112.10752v2 [cs.CV], Apr. 13, 2022, pp. 1-45.
Tobin J., et al., "Domain Randomization for Transferring Deep Neural Networks from Simulation to the Real World", 2017 IEEE/RSJ International Conference on Intelligent Robots and Systems (IROS), Sep. 24-28, 2017, 28 Pages.
Van Den Oord A., et al., "Neural Discrete Representation Learning", arXiv:1711.00937v2 [cs.LG], Advances in Neural Information Processing Systems, May 30, 2018, 11 pages.
Zhu J-Y., et al., "Unpaired Image-to-Image Translation using Cycle-Consistent Adversarial Networks", arXiv:1703.10593v7 [cs.CV], Aug. 24, 2020,18 Pages.

* cited by examiner

MULTI-DIMENSIONAL MATERIAL-AWARE GEOMETRIC WIRELESS CHANNEL RENDERING USING MACHINE LEARNING MODELS

CROSS-REFERENCE TO RELATED APPLICATIONS

This application claims priority to and benefit of U.S. Provisional Patent Application Ser. No. 63/602,986, entitled "Multi-Dimensional Material-Aware Geometric Wireless Channel Rendering Using Machine Learning Models," filed Nov. 27, 2023, and assigned to the assignee hereof, the entire contents of which are hereby incorporated by reference.

INTRODUCTION

Aspects of the present disclosure relate to using machine learning models to simulate a wireless channel.

In a wireless communications system, a transmitter and a receiver communicate by transmitting signals to each other over a wireless channel. The signals may be represented as a plurality of multipath components received at a receiver on a given frequency band. Information about a wireless channel can be used for various purposes. For example, information about the wireless channel can be used to identify various parameters for communications between a transmitter and a receiver, such as beamforming parameters, directional beam selection, and the like. Information about a wireless channel can also be used to determine the layout of a spatial environment in which the transmitter and receiver are located, which in turn may be used for various purposes such as detecting entry and exit of devices into different areas (e.g., defined based on a radius from a given device). Layout information and location estimation can be used for many other purposes as well, such as emergency management within the spatial area, spatial optimization, and the like.

The state of a wireless channel may generally depend on various factors in the spatial environment. For example, a wireless channel may be affected by sources of radio frequency interference, such as interfering network entities. Furthermore, hard surfaces of various objects, such as walls, support columns, or the like, and the materials in these environments, may introduce attenuation and reflections of radio waves in radio frequency measurements obtained within the spatial environment. Because the state of a wireless channel may depend on many factors that are different across different environments, it may be difficult to estimate the state of a wireless channel.

BRIEF SUMMARY

Certain aspects of the present disclosure provide methods for estimating a wireless channel using learned material parameters associated with objects in a spatial environment. An example method of wireless communication generally includes receiving, from a ray-tracing model, a plurality of multipath components corresponding to a signal transmitted from a transmitter at a first location in a spatial environment to a receiver at a second location in the spatial environment. For each respective multipath component from the plurality of multipath components, energy field characteristics of the respective multipath component are estimated, using a machine learning model, based on interactions with one or more objects in the spatial environment. One or more learned parameters of the machine learning model are associated with one or more properties of the one or more objects. A channel estimate is generated based on the estimated energy field characteristics of each multipath component of the plurality of multipath components. One or more actions are taken based on the generated channel estimate.

Certain aspects of the present disclosure provide methods for training a machine learning model for estimating a wireless channel using learned material parameters associated with objects in a spatial environment. An example method of machine learning generally includes receiving, from a ray-tracing model, a plurality of signal path simulations including a plurality of multipath components. Each signal path simulation corresponds to a signal received from a transmitter at a first location in a spatial environment at a receiver at a second location in the spatial environment. Based on the plurality of signal path simulations, a machine learning model is trained to estimate energy field characteristics of multipath components of the signal based on interactions with one or more objects in the spatial environment. One or more parameters of the machine learning model are associated with one or more properties of the one or more objects. The trained machine learning model is deployed.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain features of various aspects of the present disclosure and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
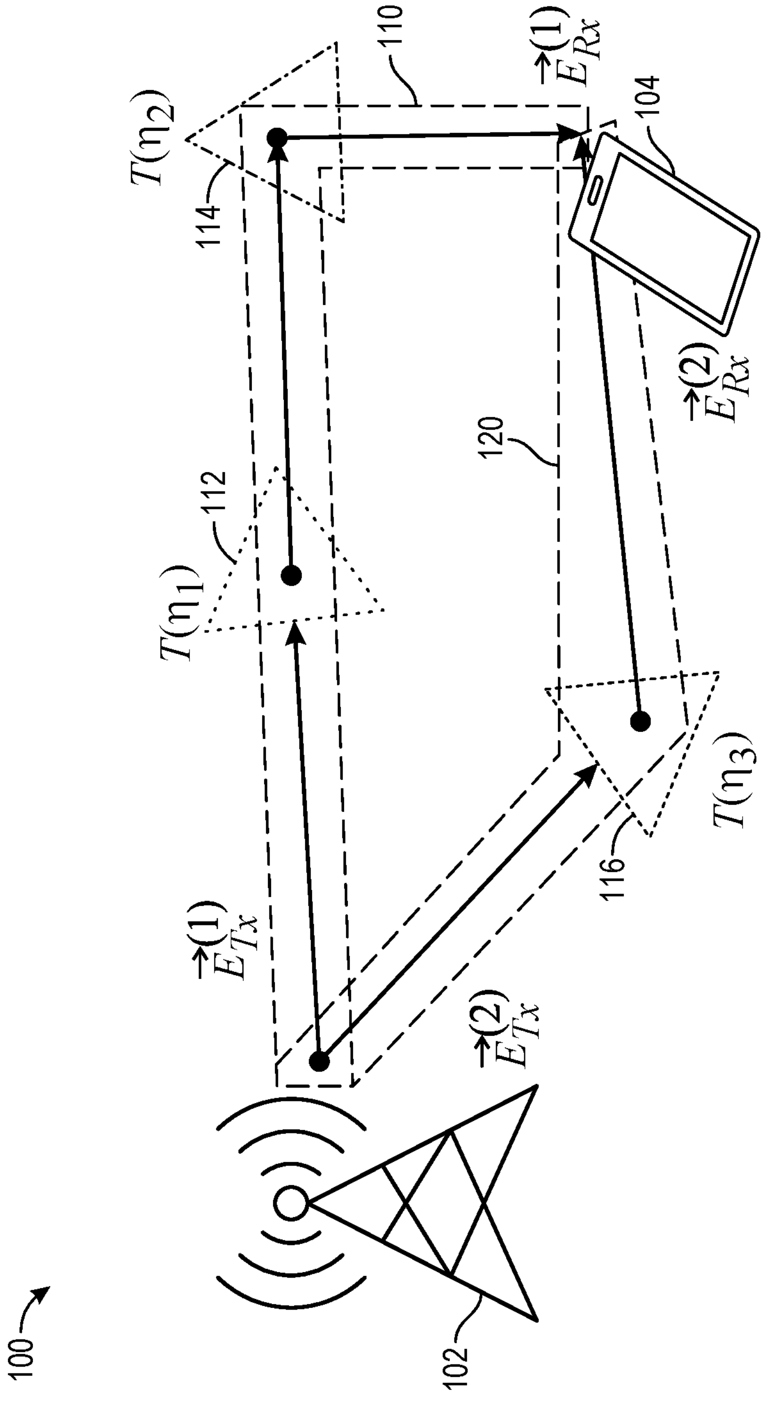
FIG. 1 depicts signals transmitted between a transmitter and a receiver in a spatial environment including one or more objects with which the signals interact.

Aspects of the present disclosure provide techniques for estimating a channel between a transmitter and a receiver based on learned parameters associated with material properties of objects (e.g., object surfaces) within a spatial environment with which signals interact along a path from the transmitter to the receiver.

Information about a channel, such as an estimate of the channel at a receiver, can be used for various tasks within a wireless communications system and/or within systems that use devices that communicate within a wireless communications system. For example, the information about a channel can be used for signal management, such as beamforming or beam selection, for communications between the transmitter and the receiver. Moreover, information about a channel can be used for various sensing tasks, such as location estimation, floor map estimation, or the like. This information may, in turn, be used to determine how a spatial area is to be used, to generate a virtual reality or extended reality scene in the spatial area, for traffic management within the spatial area, for location estimation, and the like. Furthermore, learnt positions of signal reflectors in a spatial environment and the signal reflection properties of these reflectors can be used to perform various tasks in dynamic environments, such as autonomous driving or other autonomous operations in which the state of the environment continually changes.

Various techniques can be used to estimate information about a channel, given information about the location of a transmitter and the location of a receiver in a spatial environment. For example, neural statistical models, implemented as deep neural networks (DNNs), can be used to generate an estimation of a channel based on various field measurements for the transmitter and receiver. These models may allow for the estimation of a channel in various generic scenarios with minimal, or at least relatively very low, computational expense. However, the channel estimates generated by these models may reflect channel estimates in a generic environment and may not take into account environment-specific properties that affect the state of the channel at the receiver. For example, these generic models may not take into account reflections of signals off of surfaces within a spatial environment, signal attenuation due to these reflections, relative permittivity and/or conductivity properties (and/or other signal attenuation and/or reflectivity properties) of different materials used within a spatial environment, and the like.

Aspects of the present disclosure provide techniques that allow for a channel to be estimated based on learned material properties of objects (e.g., permittivity, conductivity, etc. as a function of one or more of object thickness, object surface smoothness/roughness, etc.) in a spatial environment with which a signal interacts along a path from a transmitter to a receiver. By doing so, aspects of the present disclosure can generate accurate estimations of a channel between a transmitter and a receiver in any given environment. These estimations of a channel may take into account different components of a wireless signal that are received at the receiver at different times due to different propagation paths within the spatial environment and can accurately model the effects of the different objects (and surfaces thereof) with which signals interact within a spatial environment on the energy field of a received signal at the receiver.

By accurately estimating a channel in a spatial environment, aspects of the present disclosure may allow for improved accuracy in applications that use estimates of a channel to perform various tasks. For example, accurate channel estimations generated by machine learning models as discussed herein may allow for improved communications in various spatial environments and at various frequencies at which transmitters and receivers communicate, as these accurate channel estimations may be used to identify blockages within the spatial environment that degrade a wireless signal, to estimate optimal beams to use in high-frequency (e.g., millimeter wave (mmWave)) communications between a transmitter and a receiver, and the like. Further the machine learning models discussed herein may allow for propagation of a signal between a transmitter and a receiver to be modeled, which may allow for information about the spatial environment, such as the presence of reflective or refractive object surfaces in the spatial environment and the radio frequency reflectivity and attenuation properties of these object surfaces, to be obtained from the estimation of the channel generated by these machine learning models.

Example Radio Frequency Signals in a Spatial Area

FIG. 1 illustrates example signals transmitted between a transmitter and a receiver in a spatial environment including one or more object surfaces with which the signals interact.

As illustrated, a transmitter 102 located within a three-dimensional spatial environment 100 transmits signals to a receiver 104 located within the three-dimensional spatial environment 100. The transmitter 102 may be, for example, a gNodeB in a cellular telecommunications system, an access point (AP) in a wireless local area network (WLAN), or the like, and the receiver 104 may be, for example, a user equipment (UE) serviced by the gNodeB, a station (STA) serviced by the AP, or the like.

Because the spatial environment 100 includes various objects from which signals can be reflected or transmitted through, such as walls, floors, ceilings, or other surfaces, signaling transmitted between the transmitter and the receiver may include a line-of-sight (LOS) component (not illustrated) and one or more non-LOS components reflected off of or transmitted through the object in the spatial environment 100. Thus, because a receiver can receive a signal including an LOS component and non-LOS components, a total impulse response (or signal strength) $f_\theta$ for any signal transmitted by transmitter may include the impulse response for the LOS component and the impulse responses for the non-LOS components.

In the example illustrated in FIG. 1, the transmitter 102 emits a signal which is received at the receiver 104 as two multipath components (though it should be recognized that the transmitter 102 can emit a signal that is received at the receiver 104 as any number of multipath components which may include LOS and non-LOS components, and the illustration of the two multipath components in FIG. 1 is a simplified example for illustrative purposes). The first multipath component 110 may have an emitted electric field of $$\vec{E}_{Tx}^{(1)}$$

and a received energy field of $$\vec{E}_{Rx}^{(1)}$$

after interaction with a first surface 112 (e.g. a surface of a first object) having material properties $T(\eta_1)$ and a second surface 114 (e.g., a surface of a second object or a different surface of the first object) having material properties $T(\eta_2)$. Meanwhile, the second multipath component 120 may have an emitted electric field of $$\vec{E}_{Tx}^{(2)}$$

and a received energy field of $$\vec{E}_{Rx}^{(2)}$$

after interaction with a third surface 122 (e.g., a surface of a third object or a different surface of the first or second object) having material properties $T(\eta_3)$.

To estimate a channel within the spatial environment 100, various models can be used to identify multipath components within the spatial environment 100 and to estimate the received energy fields for each of these multipath components. However, these models, such as ray-tracing simulators, generally do not model a complete set of propagation phenomena for signals in a spatial environment. For example, these models may model phenomena such as free space attenuation of a signal, but may assume a uniform effect of surfaces with which signals interact in the spatial environment 100. However, different materials have different effects on the energy field of a signal when a signal interacts with such a material. For example, some materials from which object surfaces in the spatial environment are composed, such as concrete or metal, may have relatively low relative permittivity and high absorption characteristics (e.g., may introduce significant attenuation effects on a signal), while materials such as wood or wallboard may have relative high relative permittivity and low absorption characteristics (e.g., may allow for a substantial amount of the energy field of a signal to pass through the material). Other materials that are highly reflective to radio frequency signals, such as metals, may have conductivity characteristics that attenuate a signal more than a comparably thick non-reflective surface. Furthermore, these models may not account for the thickness of a material and thus may not account for internal reflection and absorption in estimating the energy field of a signal after interaction with an object in the spatial environment 100. Thus, channel estimates generated by these models may have a significant delta relative to the actual channel estimates measured at the receiver.

To account for various properties of three-dimensional spatial environments that influence signal reflection and signal attenuation, and to allow for channel estimation within various spatial environments based on signal measurements obtained for a received signal within a spatial environment, aspects of the present disclosure provide techniques for estimating a representation of a channel using learned material parameters associated with properties of an object (e.g., material properties of object surfaces) in a spatial environment. As discussed in further detail herein, a channel may be estimated based on estimations of signal attenuation due to propagation distance and of signal attenuation due to ray-surface interactions (e.g., signal absorption, reflection angle, etc.). The overall channel may be rendered based on these estimations, resulting in an overall channel estimate that accounts for the properties of the materials with which signals interact and thus may result in channel estimates generated by a machine learning model that more closely approximates real-world channel estimates than channel estimates generated by machine learning models that do not account for the material properties of object surfaces in the spatial environment with which signals interact. In turn, this may allow for improvements in wireless communications systems, as accurate channel estimate maps in a spatial environment may be generated. These accurate channel estimate maps may be used, for example, to identify areas such as dead spots which can be addressed by the addition of additional transmitters in these areas, optimize handover parameters within a wireless network deployed in the spatial environment, and the like.

Example Estimation of a Wireless Channel Using Learned Object Surface Material Properties Within a wireless communication system, a signal may be represented as a series of rays emitted from a location within a spatial environment of a transmitter and received if a signal reaches a reception ellipsoid (e.g., a sphere or non-spherical three-dimensional figure with an elliptical shape) defined by a location of a receiver within the spatial environment and a radius from this location. To model a signal, a surface of an ellipsoid around a transmitter may be tessellated into a collection of surfaces (e.g., arcs, circles, polygons, etc.), and rays may be launched from the transmitter omnidirectionally, with each ray corresponding to a specific surface from the collection of surfaces. As discussed in further detail, each ray may be traced until the ray meets specified termination criteria (e.g., exits the spatial environment, reaches a defined maximum number of reflections or diffractions, etc.), the signal strength of the ray falls below a threshold strength, or until the ray reaches the reception ellipsoid, which may be defined as a sphere with a radius of $$\frac{\alpha d}{\sqrt{3}},$$

where $\alpha$ represents the angle between adjacent rays received by the receiver and d represents the ray length.

To model the impulse response, or received energy field, of a ray, defined as $u_k$, an impulse response $f_\theta$ may be defined according to the expression:

$$f_\theta : F \times u_k^{(r)} \mapsto u_k^{(r+1)},$$

where F represents the spatial environment and $$u_k^{(r)}$$

represents the state of a ray after r interactions within the spatial environment. The spatial environment F may be represented in various manners, such as a series of vertices V, a series of polygonal (e.g., triangular) faces F, a three-dimensional mesh (defined as a collection of vertices V and faces F), or the like. Generally, the spatial environment F may correspond to a specific geometry (e.g., a known three-dimensional layout of the spatial environment, such as an internal layout of an area within a building or an external layout of an area including a plurality of buildings and/or other objects, such as foliage, light poles, etc.) and may not embed information about the materials within the spatial environment. Because the spatial environment F does not embed information about the materials with the spatial environment, machine learning models that estimate a channel in a spatial environment based on ray propagation may not accurately model the impulse response of each ray. Thus, some rays may have a larger energy field when deemed to have been received at the receiver, while other rays may have a smaller energy field (or potentially not even be actually received) when deemed to have been received at the receiver.

Figure 2:
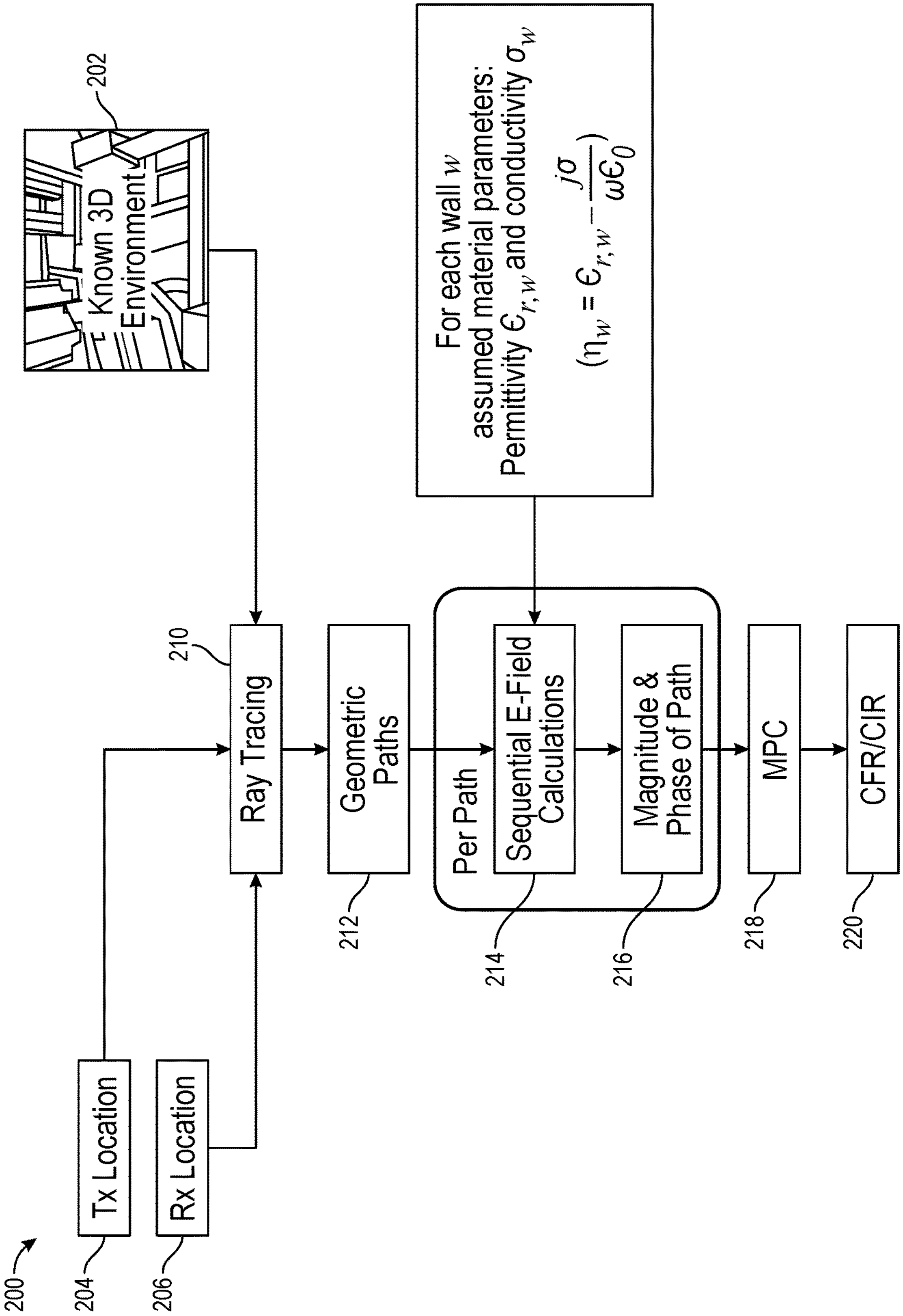
FIG. 2 depicts an example machine learning model that estimates a wireless channel using learned material parameters associated with properties of objects in a spatial environment, according to aspects of the present disclosure.

FIG. 2 depicts an example pipeline 200 for estimating a wireless channel using learned material parameters associated with object surfaces in a spatial environment, according to aspects of the present disclosure.

As illustrated in the pipeline 200, a spatial environment in which a machine learning model is trained and used to estimate a wireless channel may be defined as an a-priori-defined three-dimensional layout 202 of the spatial environment, a plurality of transmitter locations 204, and a plurality of receiver locations 206. The three-dimensional layout 202 of the spatial environment may include the locations of objects in the spatial environment, as well as information about the materials associated with each object in the spatial environment. For example, in a simplified model, the three-dimensional layout 202 of the spatial environment may include two materials, ground and concrete, and it may be assumed that in the spatial environment, object surfaces with which signals interact may be one of these two materials. It should be recognized, however, that the three-dimensional layout 202 of the spatial environment may include any number of materials with which signals interact. For each material in the spatial environment, assumed parameters corresponding to the radio frequency permittivity $\in_{T,W}$ and conductivity $\sigma_w$ properties for an object surface (wall) w may be defined. As discussed in further detail below, these assumed material parameters may be refined based on a comparison between ground-truth (or real-world) channel measurements and the predicted channel estimates generated by a machine learning model.

For each transmitter-receiver pair, defined by a transmitter location 204 in the spatial environment and a receiver location 206 in the spatial environment, a predicted channel estimate may be generated based on a set of rays corresponding to multipath components of a signal transmitted from the transmitter and received at the receiver. The set of rays 212 (also referred to as geometric paths) may be generated by a ray-tracing model 210 (also known as a "black-box" model) that, as discussed above, models the predicted paths from the transmitter to the receiver along which multipath components of a signal propagate, without accounting for the field properties (e.g., permittivity and/or conductivity properties (amongst others)) of the object surfaces in the spatial environment with which a signal interacts. Each ray in the set of rays generated by the ray-tracing model 210 may include a series of interaction points along a path between the transmitter location and the receiver location. Generally, the set of rays may include one line-of-sight (LOS) component, corresponding to the multipath component received at the receiver directly from the transmitter without interaction with one or more object surfaces in the spatial environment, and a plurality of non-line-of-sight (non-LOS) components corresponding to multipath components received at the receiver after interaction with one or more object surfaces in the spatial environment.

For each ray in the set of rays 212 (also referred to as a path in the set of geometric paths), an electric field may be sequentially calculated by a surrogate model 214 (also known as a digital twin of the ray-tracing model) based on interactions with different object surfaces in the spatial environment. Generally, the surrogate model 214 includes one or more learned material parameters that allows for automatic differentiation of different materials in a spatial environment. In doing so, the surrogate model 214 models propagation of a signal from a transmitter to a receiver in the same way as the (black-box) ray-tracing model 210 that generates the rays. That is, the surrogate model 214 may model the electromagnetic signal propagation properties of a ray, but may not itself generate the rays corresponding to signals received by the receiver from the transmitter.

To calculate an electric field for a ray in the set of rays 212, an initial radiated energy field $$\vec{E}_0^p$$

may be defined at point i=0. For the $m^{th}$ path of M paths in the set of paths, the path may be traversed to identify the next point on the path. Each point may correspond to an interaction with an object surface or reception of a multipath component at the receiver. Generally, a path m may include any number of surface interaction points, and a single receive point. For each point $i \in 1, \ldots, N-1$, where N corresponds to the total number of points included in a path and where i=0 corresponds to an origin point (e.g., the transmitter location 204), it may be determined whether the point corresponds to an interaction with an object surface in the spatial environment or reception of a multipath component at the receiver.

If a point corresponds to interaction with an object surface in the spatial environment, the post-interaction energy field for the signal may be calculated according to the equation:

$$\vec{E}_i^p = T(\eta_i)\vec{E}_{i-1}^p$$

where $T(\eta_i)$ represents the effect of the material properties of the object surface with which the signal interacts. $\eta_i$ may take into account the relative permittivity $\in_{r,i}$ and conductivity $\sigma_i$ properties of the $i^{th}$ object surface in the spatial environment, which may be composed of a specified material and may be represented by the equation:

$$\eta_i = \epsilon_{r,i} - \frac{j\sigma_i}{\omega\epsilon_0}$$

where ω corresponds to the angular frequency of a signal in radians (e.g., 2×π× frequency *f*) and $\in_0$ represents free space permittivity in farads per meter.

Generally, η represents complex permittivity of a material from which an object is composed and allows for the modeling of various interaction phenomena. These phenomena may include specular reflection of a signal, transmission through the object, diffraction, scattering, diffuse reflection, and the like.

If a point corresponds to reception of the signal, then the received energy field may be modeled based on a free space propagation factor $s_\eta$ and on the magnitude and phase of the signal for the total distance traveled in free space. The free space propagation factor $s_\eta$ may vary based on the frequency of the channel to account for atmospheric attenuation of signals over distance, as lower frequency signals may experience less attenuation over distance than higher frequency signals. The free-space-propagation-factor-modified energy field of the signal along the $m^{th}$ path, $$\vec{E}_{Rx}^{p},$$

may thus be represented by the equation:

$$\vec{E}_{Rx}^{p} = s_f \cdot \vec{E}_{N}^{pm}$$

The resulting electric field calculated for a signal transmitted from the transmitter to the receiver along the $m^{th}$ path in the set of paths generated by a ray-tracing model may thus be represented according to the equation:

$$\vec{E}_{Rx}^{p} = s_f \prod_i T(\eta_i) \vec{E}_{Tx}^{p}$$

In some aspects, an electric field $\vec{E}_i$ may be decomposed into a parallel component $\vec{e}_{\parallel}$ and a perpendicular component $\vec{e}_{\perp}$. The parallel component $\vec{e}_{\parallel}$ may be represented by the equation:

$$\vec{e}_{\parallel} = \frac{\vec{k}_i \times \vec{n}}{\left\| \vec{k}_i \times \vec{n} \right\|}$$

Meanwhile, the perpendicular component $\vec{e}_{\perp}$ may be represented by the equation:

$$\vec{e}_{\perp} = \frac{\vec{e}_{\perp} \times \vec{k}_i}{\left\| \vec{e}_{\perp} \times \vec{k}_i \right\|}$$

In the above equations defining the parallel and perpendicular components of an electric field $\vec{E}_i$, $\vec{k}_i$ represents the incoming wave vector, and $\vec{n}$ represents the normal vector of the object surface. Generally, after reflection, the polarization of the parallel component changes, such that the post-reflection parallel component $\vec{e}_{\parallel,r}$ is represented by the equation:

$$\vec{e}_{\parallel,r} = \frac{\vec{e}_{\perp} \times \vec{k}_r}{\left\| \vec{e}_{\perp} \times \vec{k}_r \right\|}$$

where $\vec{k}_r$ represents the outgoing wave.

To calculate the energy field of the reflected signal based on T(η), T(η) may be decomposed into a matrix:

$$\begin{pmatrix} r_{\perp}(\eta) & 0 \\ 0 & r_{\parallel}(\eta) \end{pmatrix}$$

Two projections, $P_l \rightarrow g$ and $P_g \rightarrow l$ may be defined, according to the equations:

$$P_{\ell \rightarrow g} = \begin{bmatrix} \vec{e}_{\perp}\vec{e}_x & \vec{e}_{\parallel,r}\vec{e}_x \\ \vec{e}_{\perp}\vec{e}_y & \vec{e}_{\parallel,r}\vec{e}_y \\ \vec{e}_{\perp}\vec{e}_z & \vec{e}_{\parallel,r}\vec{e}_z \end{bmatrix}$$

and $$P_{g \rightarrow \ell} = \begin{bmatrix} \vec{e}_{\perp}\vec{e}_x & \vec{e}_{\perp}\vec{e}_y & \vec{e}_{\perp}\vec{e}_z \\ \vec{e}_{\parallel}\vec{e}_x & \vec{e}_{\parallel}\vec{e}_y & \vec{e}_{\parallel}\vec{e}_z \end{bmatrix}$$

The projections may be material-independent features, while the Fresnel coefficients $r_{\perp}$ and $r_{\parallel}$ may be material-dependent factors. The Fresnel coefficients may be represented by the equations:

$$r_{\perp} = \frac{\cos\theta_i - \sqrt{\eta - \sin^2\theta_i}}{\cos\theta_i + \sqrt{\eta - \sin^2\theta_i}}$$

and $$r_{\parallel} = \frac{\eta\cos\theta_i - \sqrt{\eta - \sin^2\theta_i}}{\eta\cos\theta_i + \sqrt{\eta - \sin^2\theta_i}}$$

where $$\eta = \epsilon_r - \frac{j\sigma}{\epsilon_0 \omega}.$$

These Fresnel coefficients may assume the existence of an infinitely thick material with a uniform surface. However, because each object surface in a spatial environment may have a limited thickness and an irregular surface (at least at a microscopic level), these uncorrected Fresnel coefficients may not account for internal reflection and refraction of signal components. That is, these uncorrected Fresnel coefficients may not account for internal reflection and refraction inside an object of limited thickness and may not account for the effects of surface irregularity on a signal. Thus, corrected Fresnel coefficients may be used in calculating the energy field of a signal after interaction with an object surface in the spatial environment.

A thickness-corrected Fresnel coefficient may be represented by the equation:

$$r' = \frac{r\left(1 - e^{-2jq}\right)}{1 - r^2 e^{-2jq}}$$

where r' denotes the Fresnel coefficients for either the perpendicular or parallel components (i.e., $r_{\perp}$ or $r_{\parallel}$). The thickness correction factor q is represented by the equation:

$$q = \frac{2\pi t}{\lambda}\sqrt{\eta - \sin^2\theta_i}$$

where t represents the thickness of the object, $\lambda$ corresponds to a material-dependent factor, and $\theta_i$ corresponds to an angle from a perpendicular line to the object surface to the angle along which a signal is reflected from the object surface.

A roughness-corrected Fresnel coefficient may be represented by the equation:

$$R = R_0 \exp\left[-8\left(\frac{\pi(\Delta h)\cos\theta_i}{\lambda_0}\right)^2\right] I_0\left[8\left(\frac{\pi(\Delta h)\cos\theta_i}{\lambda_0}\right)^2\right]$$

where $R_0$ represents a smooth surface reflection coefficient, $\theta_i$ represents an angle of incidence, $\Delta h$ represents the standard deviation in surface height above the mean height of the surface, $\lambda_0$ represents the wavelength of the signal, and $I_0$ represents a zero-order Bessel function which describes the vibrations of a membrane. This roughness-corrected Fresnel coefficient may be calculated for the $m \in M$ paths in the set of paths generated by the ray-tracing model and aggregated to represent the signal received at the receiver as a set of multipath components 218 generated by the ray-tracing model 210 with electric fields predicted by the surrogate model 214. Based on the aggregated predicted electric fields, various channel estimates 220 can be generated. These channel estimates 220 may be calculated, for example, as a channel frequency response (CFR) value, a channel impulse response (CIR) value, or the like.

To train the surrogate model 214 or refine the material parameters used by the surrogate model 214 to generate the predicted electric fields discussed above, a delta may be calculated between the channel estimate generated based on the predicted electric fields and ground-truth channel measurements associated with the signal transmitted from the transmitter to the receiver. Generally, the delta may be used to optimize, or at least reduce, a loss calculated based on the delta between the between the channel estimate generated based on the predicted electric fields and ground-truth channel measurements associated with the signal transmitted from the transmitter to the receiver by backpropagating the loss through a machine learning model (e.g., the surrogate model 214) that identifies the values of the material parameters used to generate the predicted electric fields for a set of rays generated by the ray-tracing model 210. The loss function may, in some aspects, be based on a mean absolute error (MAE), a root mean squared error (RMSE), or other error calculated based on a difference between the channel estimate generated based on the predicted electric fields and ground-truth channel measurements associated with the signal transmitted from the transmitter to the receiver. In some aspects, the parameters associated with each surface material may be calculated based on minimization, or at least reduction, of the loss function based on stochastic gradient descent or other loss optimization techniques.

Generally, aspects of the present disclosure allow for the learning of material parameters for different objects in a spatial environment that closely approximate the ground-truth material parameters of these objects. By doing so, aspects of the present disclosure allow for the generation of material-dependent factors that closely replicate the effects of different materials in a three-dimensional environment and allow for improved accuracy of channel estimates for a spatial environment relative to channel estimates generated by a machine learning model that does not account for the effects of materials on channel estimates or does so based on statically defined parameters that may not represent the actual effects of these materials on channel estimates. These improved channel estimates may ultimately allow for improvements in wireless communications systems, as discussed above, by allowing for accurate identification of areas such as dead spots which can be addressed by the addition of additional transmitters in these areas, optimization (or at least refinement) of handover parameters within a wireless network deployed in the spatial environment, and the like.

Example Channel Estimation Using Learned Material Properties

Figure 3:
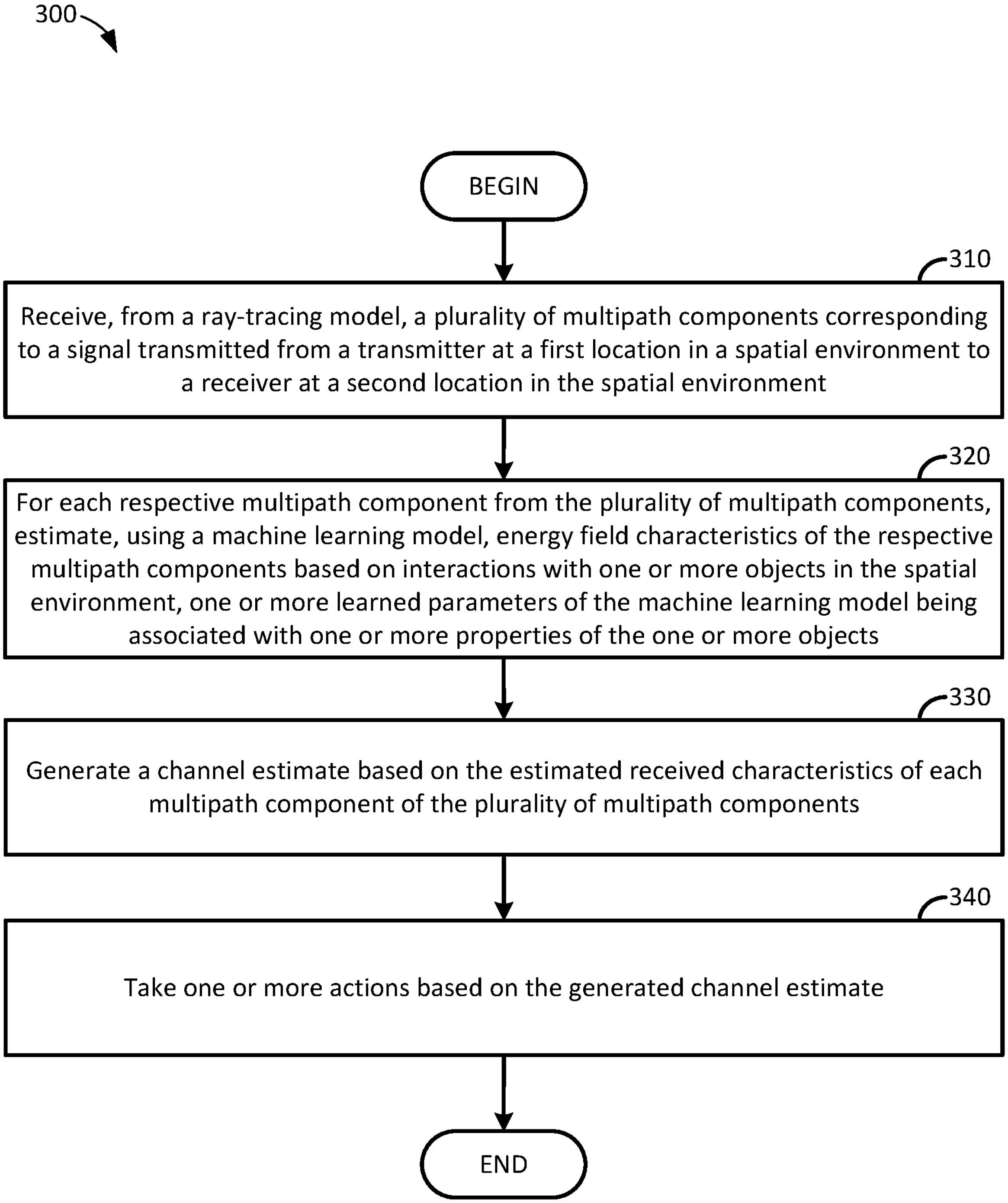
FIG. 3 depicts example operations for using a machine learning model to estimate a wireless channel using learned material parameters associated with properties of objects in a spatial environment, according to aspects of the present disclosure.

FIG. 3 illustrates example operations 300 for estimating a wireless channel using learned material parameters associated with objects (or the surfaces thereof) in a spatial environment, according to aspects of the present disclosure. The operations 300 may be performed, for example, by a base station in a wireless communications network, a user equipment in a wireless communications network, a computing device modeling the performance of a wireless communications network, or the like.

As illustrated, the operations 300 may begin at block 310, with receiving, from a ray-tracing model, a plurality of multipath components corresponding to a signal transmitted from a transmitter at a first location in a spatial environment to a receiver at a second location in the spatial environment.

At block 320, the operations 300 proceed with estimating, using a machine learning model, for each respective multipath component from the plurality of multipath components, energy field characteristics of the respective multipath component based on interactions with one or more objects in the spatial environment. Generally, one or more learned parameters of the machine learning model may be associated with one or more properties of the one or more objects in the spatial environment.

In some aspects, estimating the energy field characteristics of the respective multipath component comprises sequentially estimating characteristics of a signal at each interaction with an object of the one or more objects along a path from the transmitter to the receiver associated with the respective multipath component.

In some aspects, estimating the energy field characteristics of the respective multipath component comprises calculating an electric field at a location of an interaction (e.g., an interaction point) with an object in the spatial environment based on a free space propagation factor and the one or more learned parameters. The one or more learned parameters may include radio frequency interaction characteristics of a substance from which the object is composed. The radio frequency interaction characteristics may include at least one of permittivity or conductivity of the substance of which the object is composed.

In some aspects, estimating the energy field characteristics of the respective multipath component comprises calculating a material-dependent characteristic of a parallel component of the respective multipath component and calculating a material-dependent characteristic of a perpendicular component of the respective multipath component. Calculating the material-dependent characteristic of the parallel component and calculating the material-dependent characteristic of the perpendicular component may be based on one or more of a thickness-corrected Fresnel coefficient or a surface-smoothness-corrected Fresnel coefficient (also referred to as a roughness-corrected Fresnel coefficient).

At block 330, the operations 300 proceed with generating a channel estimate based on the estimated energy field characteristics of each multipath component of the plurality of multipath components.

In some aspects, generating the channel estimate based on the estimated energy field characteristics of each multipath component of the plurality of multipath components includes aggregating the estimated energy field characteristics of the respective multipath component into an aggregate characteristic of the signal and calculating a channel response based on the aggregate characteristic of the signal. The channel response may be calculated, for example, as a channel frequency response (CFR), a channel impulse response (CIR), or the like.

At block 340, the operations 300 proceed with taking one or more actions based on the generated channel estimate. In some aspects, the one or more actions include generating a graphical rendering of the generated channel estimate in a three-dimensional representation of the spatial environment. In some aspects, the one or more actions include selecting one or more beams for communications between the transmitter and the receiver based on the generated channel estimate.

In some aspects, the operations 300 further include calculating a delta between the generated channel estimate and a ground-truth channel state measurement for the signal. One or more of the learned parameters used in estimating the received characteristics of the multipath components are refined based on the calculated delta.

In some aspects, the operations 300 further include receiving information modeling a three-dimensional layout of the spatial environment. The multipath components may be generated by the ray-tracing model based on the three-dimensional layout of the spatial environment.

Figure 4:
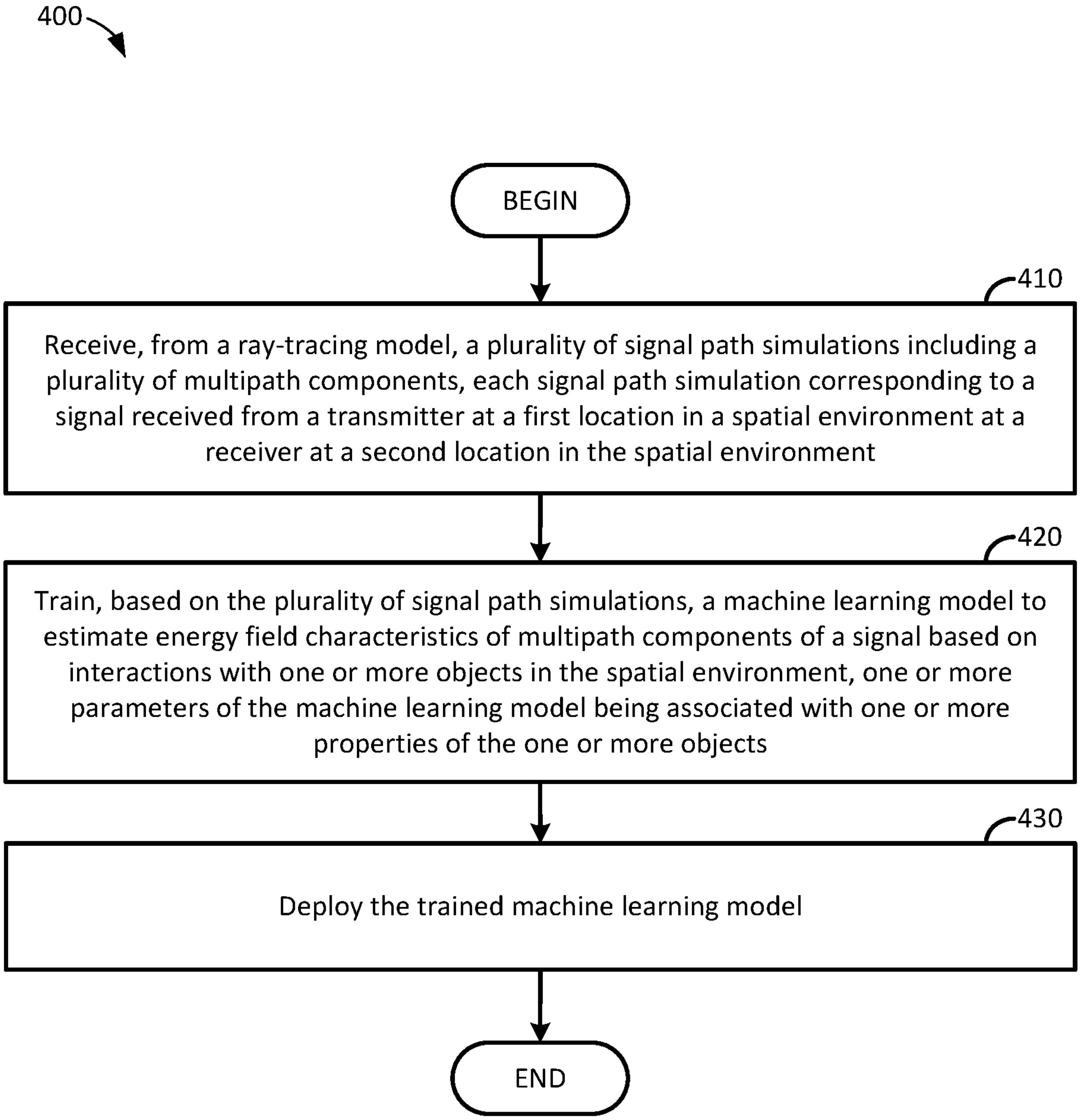
FIG. 4 depicts example operations for training a machine learning model to estimate a wireless channel using parameters associated with properties of objects in a spatial environment, according to aspects of the present disclosure.

FIG. 4 depicts example operations 400 for training a machine learning model to estimate a wireless channel using learned material parameters associated with one or more properties of objects in a spatial environment, according to aspects of the present disclosure. Operations 400 may be performed, for example, by a computing system capable of training a machine learning model, such as a cloud computing instance, a server computer, a cluster of computing devices, or the like.

As illustrated, the operations 400 begin at block 410 with receiving, from a ray-tracing model, a plurality of signal path simulations including a plurality of multipath components. Generally, each signal path simulation may correspond to a signal received from a transmitter at a first location in a spatial environment at a receiver at a second location in the spatial environment. As discussed, the plurality of multipath components associated with a signal path simulation between a transmitter and a receiver may include a line-of-sight component corresponding to a component directly received at the receiver and one or more non-line-of-sight components corresponding to components received after one or more interactions with objects in the spatial environment.

At block 420, the operations 400 proceed with training, based on the plurality of signal path simulations, a machine learning model to estimate energy field characteristics of multipath components of the signal based on interactions with one or more objects in the spatial environment. Generally, one or more parameters of the machine learning model may be associated with one or more properties of the one or more objects.

In some aspects, training the machine learning model comprises learning the one or more parameters based on adjusting a base value associated with the one or more parameters.

In some aspects, training the machine learning model is based on minimizing a loss between ground-truth channel measurements and predicted signal measurements generated by the machine learning model.

In some aspects, the one or more parameters comprise radio frequency interaction characteristics of a substance of which the object is composed.

In some aspects, the estimated received characteristics of multipath components of the signal comprise a material-dependent characteristic of a parallel component of the respective multipath component and a material-dependent characteristic of a perpendicular component of the respective multipath component. The material-dependent characteristic of the parallel component and the material-dependent characteristic of the perpendicular component may be based on a surface-smoothness-corrected Fresnel coefficient.

At block 430, the operations 400 proceed with deploying the trained machine learning model.

Figure 5:
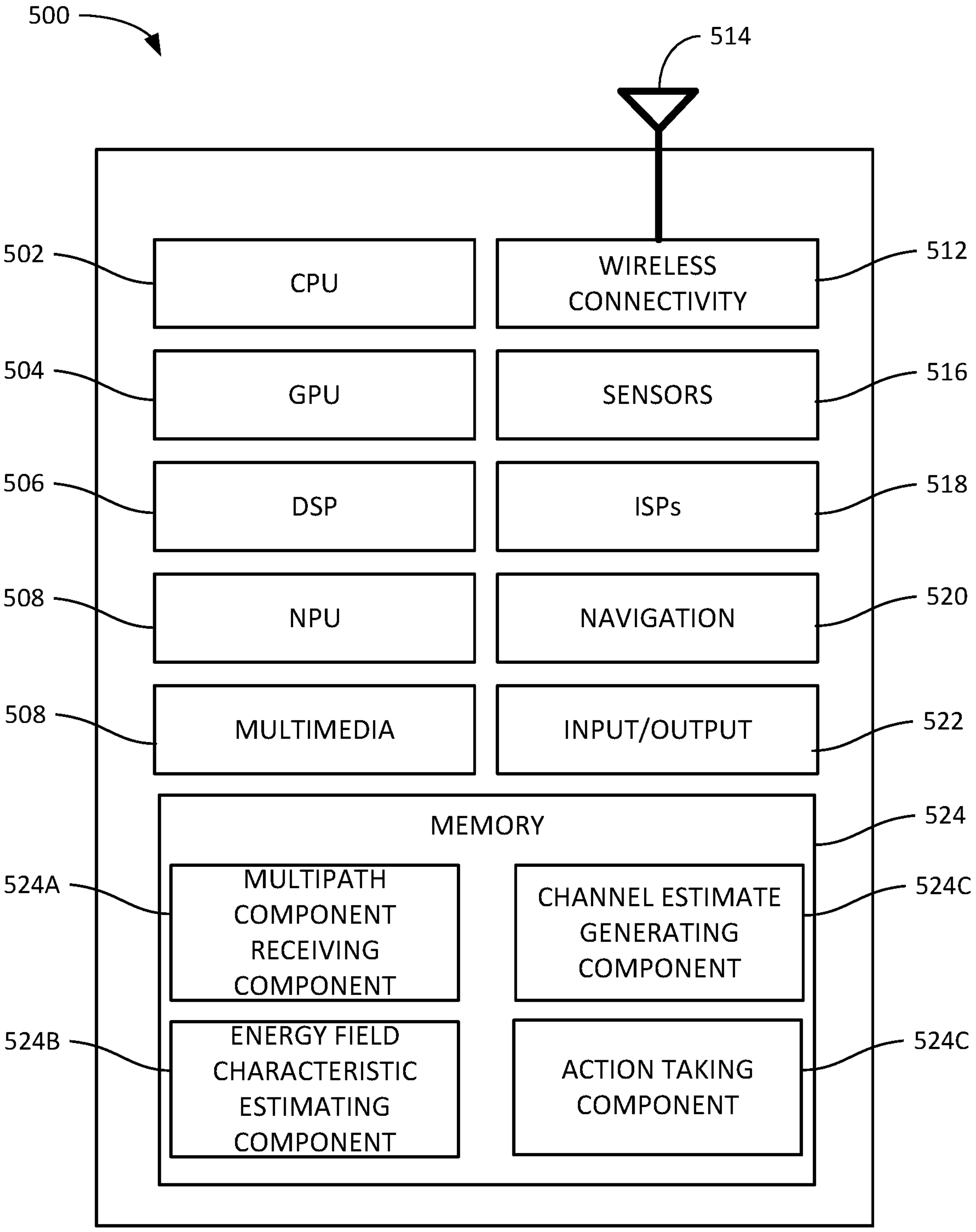
FIG. 5 depicts an example system on which aspects of the present disclosure may be implemented.

Example Processing Systems for Channel Estimation Using Learned Material Properties FIG. 5 depicts an example processing system 500 for estimating a channel in a spatial environment based on learned material properties, such as described herein for example with respect to FIG. 3.

Processing system 500 includes a central processing unit (CPU) 502, which in some examples may be a multi-core CPU. Instructions executed at the CPU 502 may be loaded, for example, from a program memory associated with the CPU 502 or may be loaded from a memory 524.

Processing system 500 also includes additional processing components tailored to specific functions, such as a graphics processing unit (GPU) 504, a digital signal processor (DSP) 506, a neural processing unit (NPU) 508, a multimedia processing unit 510, a wireless connectivity component 512.

An NPU, such as NPU 508, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPUs), neural network processor (NNP), intelligence processing unit (IPU), vision processing unit (VPU), or graph processing unit.

NPUs, such as NPU 508, are configured to accelerate the performance of common machine learning tasks, such as image classification, machine translation, object detection, and various other estimative models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong estimation involves propagating back through the layers of the model and determining gradients to reduce the estimation error.

NPUs designed to accelerate inference are generally configured to operate on complete models. Such NPUs may thus be configured to input a new piece of data and rapidly process this piece of data through an already trained model to generate a model output (e.g., an inference).

In some implementations, NPU 508 is a part of one or more of CPU 502, GPU 504, and/or DSP 506.

In some examples, wireless connectivity component 512 may include subcomponents, for example, for third generation (3G) connectivity, fourth generation (4G) connectivity (e.g., 4G Long-Term Evolution (LTE)), fifth generation (5G) connectivity (e.g., New Radio (NR)), Wi-Fi connectivity, Bluetooth connectivity, and other wireless data transmission standards. Wireless connectivity component 512 is further coupled to one or more antennas 514.

Processing system 500 may also include one or more sensor processing units 516 associated with any manner of sensor, one or more image signal processors (ISPs) 518 associated with any manner of image sensor, and/or a navigation processor 520, which may include satellite-based positioning system components (e.g., GPS or GLONASS) as well as inertial positioning system components.

Processing system 500 may also include one or more input and/or output devices 522, such as screens, touch-sensitive surfaces (including touch-sensitive displays), physical buttons, speakers, microphones, and the like.

In some examples, one or more of the processors of processing system 500 may be based on an ARM or RISC-V instruction set.

Processing system 500 also includes memory 524, which is representative of one or more static and/or dynamic memories, such as a dynamic random access memory, a flash-based static memory, and the like. In this example, memory 524 includes computer-executable components, which may be executed by one or more of the aforementioned processors of processing system 500.

In particular, in this example, memory 524 includes a multipath component receiving component 524A, an energy field characteristic estimating component 524B, a channel estimate generating component 524C, and an action taking component 524D. The depicted components, and others not depicted, may be configured to perform various aspects of the methods described herein.

Generally, processing system 500 and/or components thereof may be configured to perform the methods described herein.

Notably, in other aspects, aspects of processing system 500 may be omitted, such as where processing system 500 is a server computer or the like. For example, multimedia processing unit 510, wireless connectivity component 512, sensor processing units 516, ISPs 518, and/or navigation processor 520 may be omitted in other aspects. Further, aspects of processing system 500 may be distributed, such as training a model and using the model to generate inferences.

Figure 6:
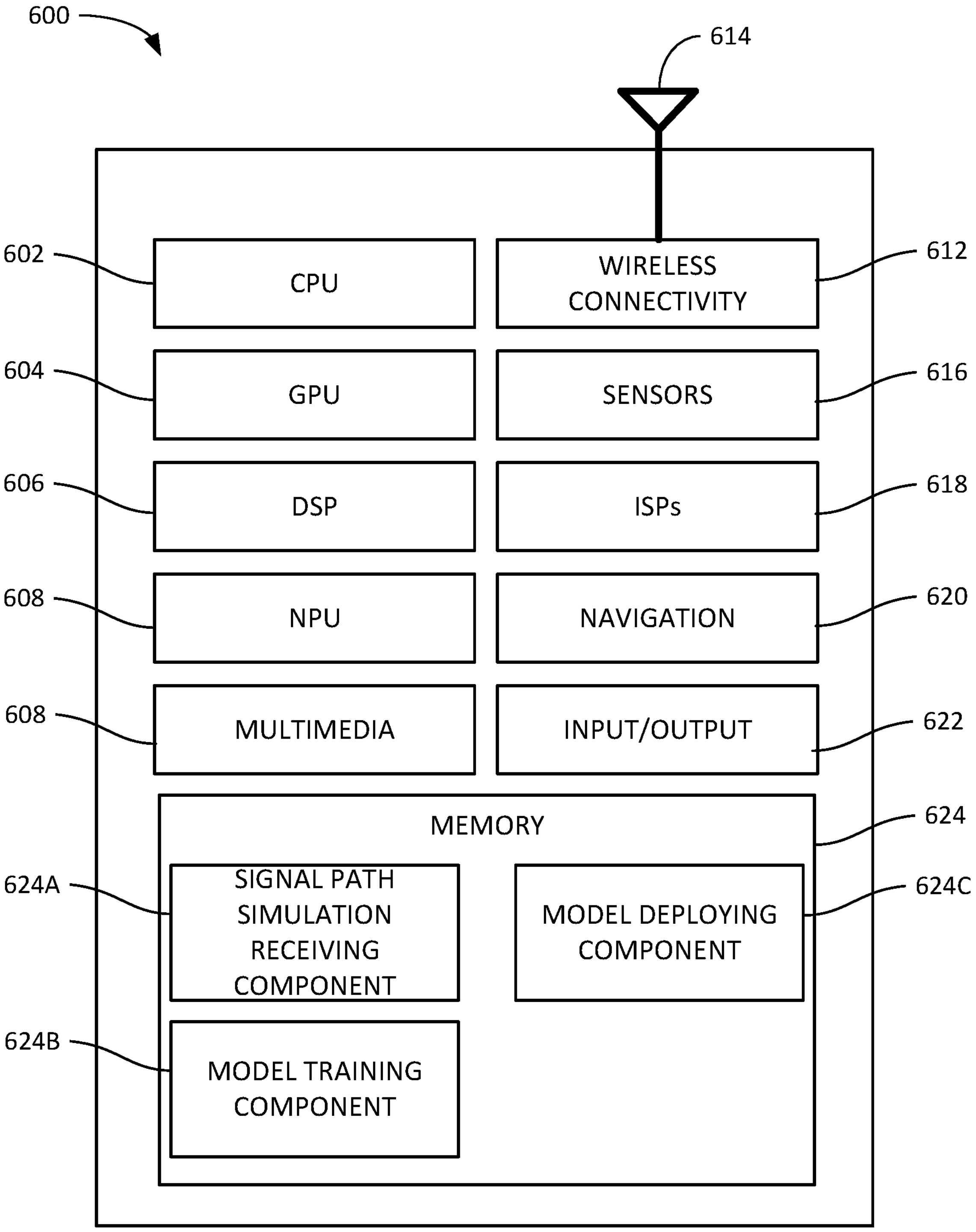
FIG. 6 depicts an example system on which aspects of the present disclosure may be implemented.

FIG. 6 depicts an example processing system 600 for training a machine learning model to estimate a channel in a spatial environment based on learned material properties, such as described herein for example with respect to FIG. 4.

Processing system 600 includes a central processing unit (CPU) 602, which in some examples may be a multi-core CPU. Instructions executed at the CPU 602 may be loaded, for example, from a program memory associated with the CPU 602 or may be loaded from a memory 624.

Processing system 600 also includes additional processing components tailored to specific functions, such as a graphics processing unit (GPU) 604, a digital signal processor (DSP) 606, a neural processing unit (NPU) 608, a multimedia processing unit 610, a wireless connectivity component 612.

An NPU, such as NPU 608, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPUs), neural network processor (NNP), intelligence processing unit (IPU), vision processing unit (VPU), or graph processing unit.

NPUs, such as NPU 608, are configured to accelerate the performance of common machine learning tasks, such as image classification, machine translation, object detection, and various other estimative models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong estimation involves propagating back through the layers of the model and determining gradients to reduce the estimation error.

NPUs designed to accelerate inference are generally configured to operate on complete models. Such NPUs may thus be configured to input a new piece of data and rapidly process this piece of data through an already trained model to generate a model output (e.g., an inference).

In some implementations, NPU 608 is a part of one or more of CPU 602, GPU 604, and/or DSP 606.

In some examples, wireless connectivity component 612 may include subcomponents, for example, for third generation (3G) connectivity, fourth generation (4G) connectivity (e.g., 4G Long-Term Evolution (LTE)), fifth generation (6G) connectivity (e.g., New Radio (NR)), Wi-Fi connectivity, Bluetooth connectivity, and other wireless data transmission standards. Wireless connectivity component 612 is further coupled to one or more antennas 614.

Processing system 600 may also include one or more sensor processing units 616 associated with any manner of sensor, one or more image signal processors (ISPs) 618 associated with any manner of image sensor, and/or a navigation processor 620, which may include satellite-based positioning system components (e.g., GPS or GLONASS) as well as inertial positioning system components.

Processing system 600 may also include one or more input and/or output devices 622, such as screens, touch-sensitive surfaces (including touch-sensitive displays), physical buttons, speakers, microphones, and the like.

In some examples, one or more of the processors of processing system 600 may be based on an ARM or RISC-V instruction set.

Processing system 600 also includes memory 624, which is representative of one or more static and/or dynamic memories, such as a dynamic random access memory, a flash-based static memory, and the like. In this example, memory 624 includes computer-executable components, which may be executed by one or more of the aforementioned processors of processing system 600.

In particular, in this example, memory 624 includes a signal path simulation receiving component 624A, a model training component 624B, and a model deploying component 624C. The depicted components, and others not depicted, may be configured to perform various aspects of the methods described herein.

Generally, processing system 600 and/or components thereof may be configured to perform the methods described herein.

Notably, in other aspects, aspects of processing system 600 may be omitted, such as where processing system 600 is a server computer or the like. For example, multimedia processing unit 610, wireless connectivity component 612, sensor processing units 616, ISPs 618, and/or navigation processor 620 may be omitted in other aspects. Further, aspects of processing system 600 may be distributed, such as training a model and using the model to generate inferences.

Example Clauses

Implementation details of various aspects are described in the following numbered clauses.

Clause 1: A processor-implemented method of wireless communication, comprising: receiving, from a ray-tracing model, a plurality of multipath components corresponding to a signal received from a transmitter at a first location in a spatial environment to a receiver at a second location in the spatial environment; for each respective multipath component from the plurality of multipath components, estimating, using a machine learning model, energy field characteristics of the respective multipath component based on interactions with one or more objects in the spatial environment, one or more learned parameters of the machine learning model being associated with one or more properties of the one or more objects; generating a channel estimate based on the estimated energy field characteristics of each multipath component of the plurality of multipath components; and taking one or more actions based on the generated channel estimate.

Clause 2: The method of Clause 1, wherein estimating the energy field characteristics of the respective multipath component comprises sequentially estimating characteristics of the respective multipath component at each interaction with an object along a path from the transmitter to the receiver associated with the respective multipath component.

Clause 3: The method of Clause 1 or 2, wherein estimating the energy field characteristics of the respective multipath component comprises calculating an electric field at a location of an interaction with an object of the one or more objects in the spatial environment based on a free space propagation factor and the one or more learned parameters, wherein the one or more learned parameters comprise radio frequency interaction characteristics of a substance of which the object is composed.

Clause 4: The method of Clause 3, wherein the radio frequency interaction characteristics comprise at least one of a permittivity or a conductivity of the substance of which the object is composed.

Clause 5: The method of any of Clauses 1 through 4, wherein generating the channel estimate based on the estimated energy field characteristics of each multipath component of the plurality of multipath components comprises: aggregating the estimated energy field characteristics of the respective multipath component into an aggregate characteristic of the signal; and calculating a channel response based on the aggregate characteristic of the signal.

Clause 6: The method of Clause 5, wherein the channel response comprises a channel frequency response.

Clause 7: The method of Clause 5 or 6, wherein the channel response comprises a channel impulse response.

Clause 8: The method of any of Clauses 1 through 7, wherein estimating the energy field characteristics of the respective multipath component comprises: calculating a material-dependent characteristic of a parallel component of the respective multipath component; and calculating a material-dependent characteristic of a perpendicular component of the respective multipath component.

Clause 9: The method of Clause 8, wherein calculating the material-dependent characteristic of the parallel component and calculating the material-dependent characteristic of the perpendicular component are based on a thickness-corrected Fresnel coefficient.

Clause 10: The method of Clause 8 or 9, wherein calculating the material-dependent characteristic of the parallel component and calculating the material-dependent characteristic of the perpendicular component are based on a surface-smoothness-corrected Fresnel coefficient.

Clause 11: The method of any of Clauses 1 through 10, further comprising: calculating a delta between the generated channel estimate and a ground-truth channel state measurement for the signal; and refining one or more of the learned parameters used in estimating the energy field characteristics of the multipath components based on the calculated delta.

Clause 12: The method of any of Clauses 1 through 11, further comprising receiving information modeling a three-dimensional layout of the spatial environment, wherein the multipath components are generated by the ray-tracing model based on the three-dimensional layout of the spatial environment.

Clause 13: The method of any of Clauses 1 through 12, wherein the taking the one or more actions comprises generating a graphical rendering of the generated channel estimate in a three-dimensional representation of the spatial environment.

Clause 14: The method of any of Clauses 1 through 13, wherein the taking the one or more actions comprises selecting one or more beams for communications between the transmitter and the receiver based on the generated channel estimate.

Clause 15: A processor-implemented method of machine learning, comprising: receiving, from a ray-tracing model, a plurality of signal path simulations including a plurality of multipath components, each signal path simulation corresponding to a signal received from a transmitter at a first location in a spatial environment at a receiver at a second location in the spatial environment; training, based on the plurality of signal path simulations, a machine learning model to estimate energy field characteristics of multipath components of a signal based on interactions with one or more objects in the spatial environment, one or more parameters of the machine learning model being associated with one or more properties of the one or more objects; and deploying the trained machine learning model.

Clause 16: The method of Clause 15, wherein training the machine learning model comprises learning the one or more parameters of the machine learning model based on adjusting a base value associated with the one or more parameters.

Clause 17: The method of Clause 15 or 16, wherein training the machine learning model is based on minimizing a loss between ground-truth channel measurements and predicted signal measurements generated by the machine learning model.

Clause 18: The method of any of Clauses 15 through 17, wherein the one or more parameters comprise radio frequency interaction characteristics of a substance of which an object of the one or more objects is composed.

Clause 19: The method of any of Clauses 15 through 18, wherein the estimated energy field characteristics of the multipath components of the signal comprise a material-dependent characteristic of a parallel component of the respective multipath component and a material-dependent characteristic of a perpendicular component of the respective multipath component.

Clause 20: The method of Clause 19, wherein the material-dependent characteristic of the parallel component and the material-dependent characteristic of the perpendicular component are based on a surface-smoothness-corrected Fresnel coefficient.

Clause 21: A processing system comprising: at least one memory comprising computer-executable instructions; and one or more processors configured to execute the computer-executable instructions and cause the processing system to perform a method in accordance with any of Clauses 1 through 20.

Clause 22: A processing system comprising means for performing a method in accordance with any of Clauses 1 through 20.

Clause 23: A non-transitory computer-readable medium comprising computer-executable instructions that, when executed by one or more processors of a processing system, cause the processing system to perform a method in accordance with any of Clauses 1 through 20.

Clause 24: A computer program product embodied on a computer-readable storage medium comprising code for performing a method in accordance with any of Clauses 1 through 20.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method of wireless communication, comprising:

receiving, from a ray-tracing model, a plurality of multipath components corresponding to a signal transmitted from a transmitter at a first location in a spatial environment to a receiver at a second location in the spatial environment;

for each respective multipath component from the plurality of multipath components, estimating, using a machine learning model, energy field characteristics of the respective multipath component based on interactions with one or more objects in the spatial environment, one or more learned parameters of the machine learning model being associated with one or more properties of the one or more objects;

generating a channel estimate based on the estimated energy field characteristics of each multipath component of the plurality of multipath components; and taking one or more actions based on the generated channel estimate.

2. The method of claim 1, wherein estimating the energy field characteristics of the respective multipath component comprises sequentially estimating characteristics of the respective multipath component at each interaction with an object of the one or more objects in the spatial environment along a path from the transmitter to the receiver associated with the respective multipath component.

3. The method of claim 1, wherein estimating the energy field characteristics of the respective multipath component comprises calculating an electric field at a location of an interaction with an object of the one or more objects in the spatial environment based on a free space propagation factor and the one or more learned parameters, wherein the one or more learned parameters comprise radio frequency interaction characteristics of a substance of which the object is composed.

4. The method of claim 3, wherein the radio frequency interaction characteristics comprise at least one of a permittivity or a conductivity of the substance of which the object is composed.

5. The method of claim 1, wherein generating the channel estimate based on the estimated energy field characteristics of each multipath component of the plurality of multipath components comprises:

aggregating the estimated energy field characteristics of the respective multipath component into an aggregate characteristic of the signal; and calculating a channel response based on the aggregate characteristic of the signal.

6. The method of claim 5, wherein the channel response comprises a channel frequency response.

7. The method of claim 5, wherein the channel response comprises a channel impulse response.

8. The method of claim 1, wherein estimating the energy field characteristics of the respective multipath component comprises:

calculating a material-dependent characteristic of a parallel component of the respective multipath component; and calculating a material-dependent characteristic of a perpendicular component of the respective multipath component.

9. The method of claim 8, wherein calculating the material-dependent characteristic of the parallel component and calculating the material-dependent characteristic of the perpendicular component are based on a thickness-corrected Fresnel coefficient.

10. The method of claim 8, wherein calculating the material-dependent characteristic of the parallel component and calculating the material-dependent characteristic of the perpendicular component are based on a surface-smoothness-corrected Fresnel coefficient.

11. The method of claim 1, further comprising:

calculating a delta between the generated channel estimate and a ground-truth channel state measurement for the signal; and refining one or more of the learned parameters used in estimating the energy field characteristics of the multipath components based on the calculated delta.

12. The method of claim 1, further comprising receiving information modeling a three-dimensional layout of the spatial environment, wherein the multipath components are generated by the ray-tracing model based on the three-dimensional layout of the spatial environment.

13. The method of claim 1, wherein the taking the one or more actions comprises generating a graphical rendering of the generated channel estimate in a three-dimensional representation of the spatial environment.

14. The method of claim 1, wherein the taking the one or more actions comprises selecting one or more beams for communications between the transmitter and the receiver based on the generated channel estimate.

15. A processor-implemented method of machine learning, comprising:

receiving, from a ray-tracing model, a plurality of signal path simulations including a plurality of multipath components, each signal path simulation corresponding to a signal received from a transmitter at a first location in a spatial environment at a receiver at a second location in the spatial environment;

training, based on the plurality of signal path simulations, a machine learning model to estimate energy field characteristics of multipath components of the signal based on interactions with one or more objects in the spatial environment, one or more parameters of the machine learning model being associated with one or more properties of the one or more objects; and deploying the trained machine learning model.

16. The method of claim 15, wherein training the machine learning model comprises learning the one or more parameters of the machine learning model based on adjusting a base value associated with the one or more parameters.

17. The method of claim 15, wherein training the machine learning model is based on minimizing a loss between ground-truth channel measurements and predicted signal measurements generated by the machine learning model.

18. The method of claim 15, wherein the one or more parameters of the machine learning model comprise radio frequency interaction characteristics of a substance of which an object of the one or more objects is composed.

19. The method of claim 15, wherein the estimated energy field characteristics of the multipath components of the signal comprise a material-dependent characteristic of a parallel component of the respective multipath component and a material-dependent characteristic of a perpendicular component of the respective multipath component.

20. The method of claim 19, wherein the material-dependent characteristic of the parallel component and the material-dependent characteristic of the perpendicular component are based on a surface-smoothness-corrected Fresnel coefficient.

* * * * *